United States Patent [19]

Shapiro et al.

[11] 4,156,166

[45] May 22, 1979

[54] METHOD AND APPARATUS FOR SAVING ENERGY

[75] Inventors: Haskell Shapiro, Corona Del Mar; Robert C. Kilpatrick, El Toro, both of Calif.

[73] Assignee: Royal Industries, Inc.

[21] Appl. No.: 752,689

[22] Filed: Dec. 20, 1976

Related U.S. Application Data

[63] Continuation-in-part of Ser. No. 715,629, Aug. 18, 1976, abandoned.

[51] Int. Cl.$^2$ .................. H05B 37/02; H05B 39/04; H05B 41/36
[52] U.S. Cl. .................. 315/209 R; 315/200 A; 315/306; 315/307; 315/308; 315/291; 315/311; 315/224; 315/241 P
[58] Field of Search ............... 315/208, 209, 224, 289, 315/306, 307, 310, 311, 291, 308, 200 A, 241 P

[56] References Cited

U.S. PATENT DOCUMENTS

| | | | |
|---|---|---|---|
| 3,471,747 | 10/1969 | Gershen | 315/205 |
| 3,648,106 | 3/1972 | Engel et al. | 315/207 |
| 3,670,202 | 6/1972 | Paine et al. | 315/307 |
| 3,821,601 | 6/1974 | Kappenhagen et al. | 315/311 |
| 3,890,537 | 6/1975 | Park et al. | 315/208 |
| 3,967,159 | 6/1976 | Dendy et al. | 315/308 |
| 3,989,976 | 11/1976 | Tabor | 315/291 |
| 3,999,100 | 12/1976 | Dendy et al. | 315/291 |

*Primary Examiner*—Saxfield Chatmon, Jr.
*Attorney, Agent, or Firm*—Edward J. DaRin

[57] ABSTRACT

A method and apparatus for regulating the output flux generated by a lamp with the degeneration of the voltage from a power source such as a battery. The regulating circuit maintains a constant luminous flux output from a lamp over a substantial range of voltages by switching the voltage to the lamp on and off at a preselected and controlled duty cycle. The duty cycle varies with the variations in the lamp electrical operating parameter provided to the regulating circuit. The regulating circuit permits the useful life of a power source to be substantially increased before requiring replacement.

78 Claims, 12 Drawing Figures

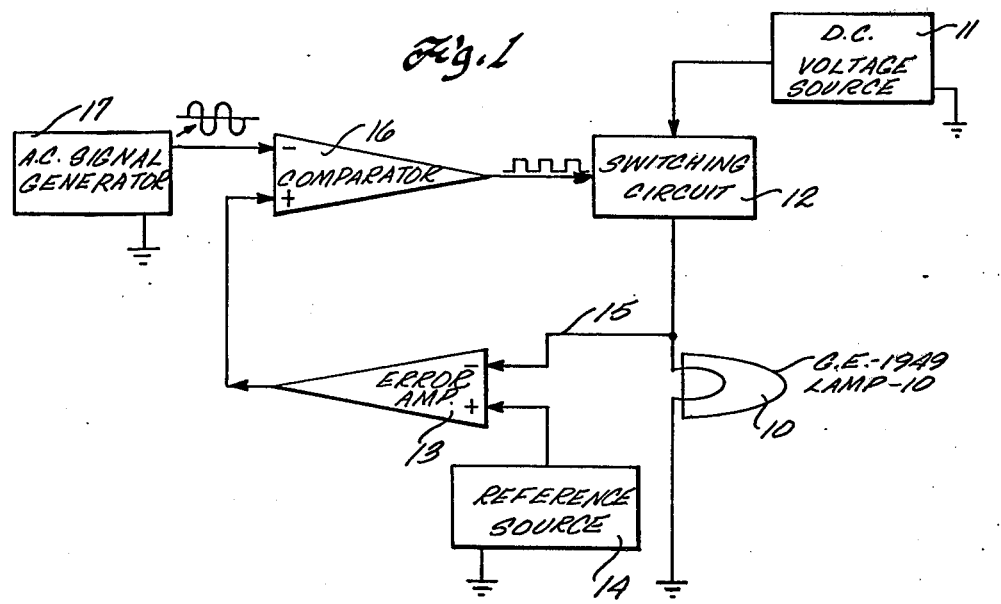
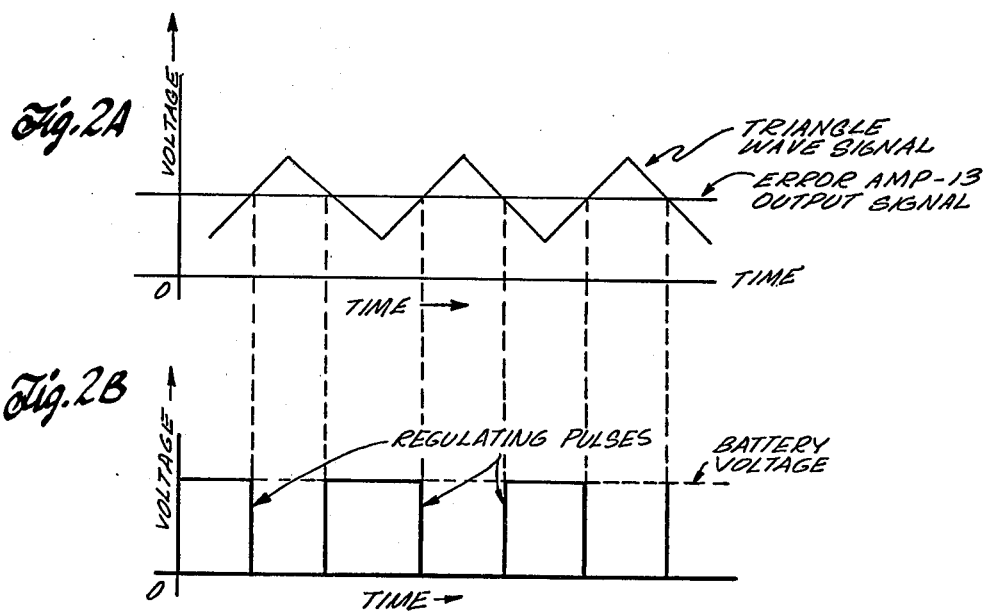

METHOD AND APPARATUS FOR SAVING ENERGY

CROSS REFERENCE TO RELATED APPLICATION

This application is a continuation-in-part of our co-pending application bearing Ser. No. 715,629, filed Aug. 18, 1976, now abandoned.

DISCLOSURE OF THE INVENTION

This invention relates to a method and apparatus for saving the energy of a power source and more particularly to regulating circuits for allowing DC or battery powered lamps to be efficiently operated at a desired, constant output light level over a wide range of source voltages without the need for replacing the power source.

One form of direct current powered lamp is the conventional hazard warning lamp that may be controlled to flash on and off to signal a hazard to a motorist or pedestrian. A timing device is conventionally employed with these flashing lamps to control the duration of the flash to some preselected, fixed time interval which is typically 100 milliseconds. A major cost in the use of battery operated flashers is the cost of replacing the battery which is employed for powering these hazard warning lights. It has been found that when a battery is new its voltage is high so that the luminous flux output of the lamp is greater than required. This excessive generation of luminous flux from the lamp is wasteful of the battery power and contributes to the degeneration of the battery voltage at a faster rate than necessary. As the battery voltage decreases with use, a point is reached when the luminous flux output of the lamp is at the desired preselected light level. Any further use of the battery beyond this voltage level results in a reduction of luminous flux output. In present day battery powered warning systems this occurs at about 75–80 percent of the rated battery voltage or the battery voltage at the time of installation of a new battery. It is then necessary to replace such a battery even though its full power capabilities have not been expended. Any attempt to operate at lower battery voltages by using lamps of a lower voltage rating has resulted in accelerating the initial waste of power and also lowers the lamp filament life.

The present invention provides a relatively inexpensive regulation method and regulation circuits for DC or battery powered lamps to maintain a constant luminous flux output from the lamp over a substantial range of voltages of the source to extend the life of the battery for substantially longer periods of time than it was heretofore thought possible. In accordance with the teachings of the present invention, battery powered lamps may be used until about 50 percent of the rated voltage of the battery is reached as contrasted with the present day battery lives of 75–80 percent of the new battery voltage. This represents a substantial increase in battery life than that possible with present day systems. While increasing the battery life, the method and apparatus of the present invention prevents excessive power dissipation when the initial or rated voltage is delivered from the battery. The regulating system of the present invention prevents the wasting of energy when the battery is new or the voltage is high by switching the battery on and off to the lamp at a controlled duty cycle to maintain a constant flux output from the lamp. When the voltage is less than the rated voltage of the battery or the power source, the regulator increases the duty cycle to compensate for the reduced voltage to maintain the desired light output from the lamp. In addition, the regulating system of the present invention allows a lower voltage rated lamp to be employed than the rated voltage output for the power source without excessive energy dissipation so that the battery can be used until the voltage reaches approximately 50 percent of its initial voltage level. For example, a 6-volt lamp can be used with a 12-volt supply thereby yielding a significant increase in battery life not heretofore thought possible. The luminous light flux from the lamp is controlled by the regulating systems of the present invention by varying the duty cycle at which the lamp is switched on and off in response to a feedback signal from the energized lamp representative of a lamp operating parameter which may be either lamp voltage or lamp resistance.

From a method standpoint, the method of the present invention maintains a luminous flux output of a DC powered lamp substantially constant with variations in the voltage output of the power source through the steps of sensing the lamp parameter to be controlled and providing a feedback signal proportional to the value sensed. This lamp feedback signal is compared with a reference signal proportioned to maintain the luminous flux output of the lamp at a preselected constant level and providing a comparison output signal representative of any deviations between the feed back signal and the reference signal. The comparison output signal is employed for switching the power source to the lamp on and off at a duty cycle proportioned relative to the magnitude of the comparison output signal to maintain a substantially constant flux output from the lamp over a relatively wide range of voltage variations in the source.

In a specific apparatus embodiment of the present invention, a regulating system for a DC powered lamp comprises a bridge circuit having impedance means of preselected impedance value arranged in three legs of the bridge circuit and a lamp to be regulated connected as the fourth leg of the bridge circuit. The value of the impedance means in each of the three legs of the bridge circuit are proportioned relative to the impedance of the lamp undergoing regulation to provide a balanced bridge circuit condition when the energized lamp produces a preselected luminous flux output. The error amplifying means has its input circuit connected to the pair of junctions between each pair of legs of the bridge circuit for detecting the deviations in impedance exhibit by the lamp and provides an amplifier error output signal in accordance with the sensed deviations. The regulation system includes an alternating current signal generating means providing an output signal having a preselected wave shape and exhibiting reversals in direction regularly and continuously. Comparison means are coupled to be responsive to the output signals from the signal generating means and the error amplifying means for providing lamp regulating output signal pulses during the time intervals one of the input signals has a greater instantaneous voltage magnitude than the other signal. The source of DC voltage or the battery is coupled between the other pair of junctions of the legs of the bridge circuit for powering the bridge circuit. Electrical switching circuit means is coupled to be responsive to the lamp regulating output signal pulses from the comparison means and is coupled between the power source and the bridge circuit for coupling the power source to the bridge circuit in accordance with the reception of a regulating signal pulse and for decoupling the power source from the bridge circuit in the absence of a regulating signal pulse.

These and other features of the present invention may be more fully appreciated when considered in the light of the following specification and drawings, in which:

FIG. 1 is a general block diagram of the energy saving system concept embodying the present invention;

FIG. 2A is a graphical representation of a typical output signal from the AC signal generator and a typical output signal from the error amplifier for the system illustrated in FIG. 1;

FIG. 2B is a graphical representation of the regulating output signal pulses derived from the comparison means of the system of FIG. 1;

Figure 3:
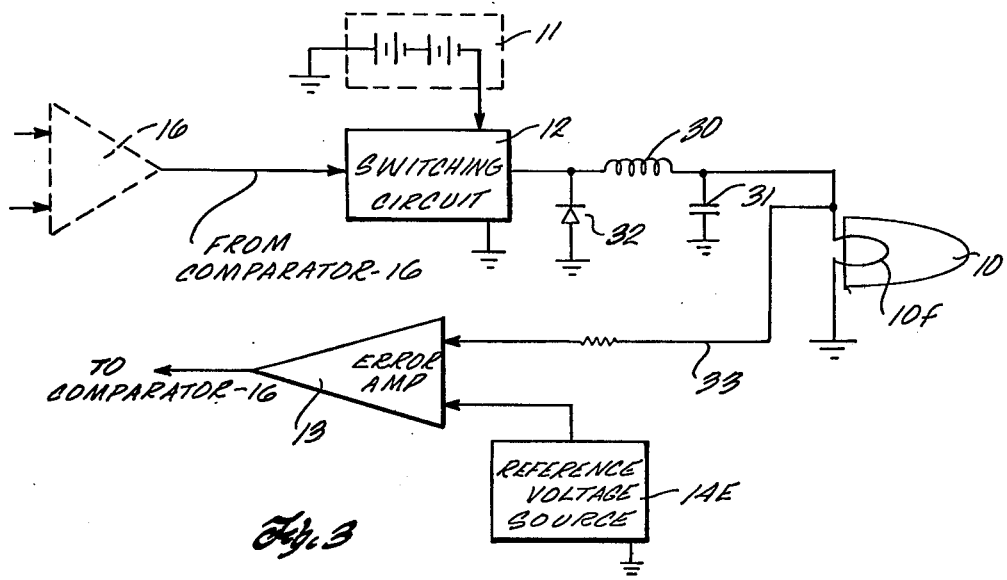
FIG. 3 is a schematic-block diagram of one embodiment of the regulating system of FIG. 1.
Figure 4:
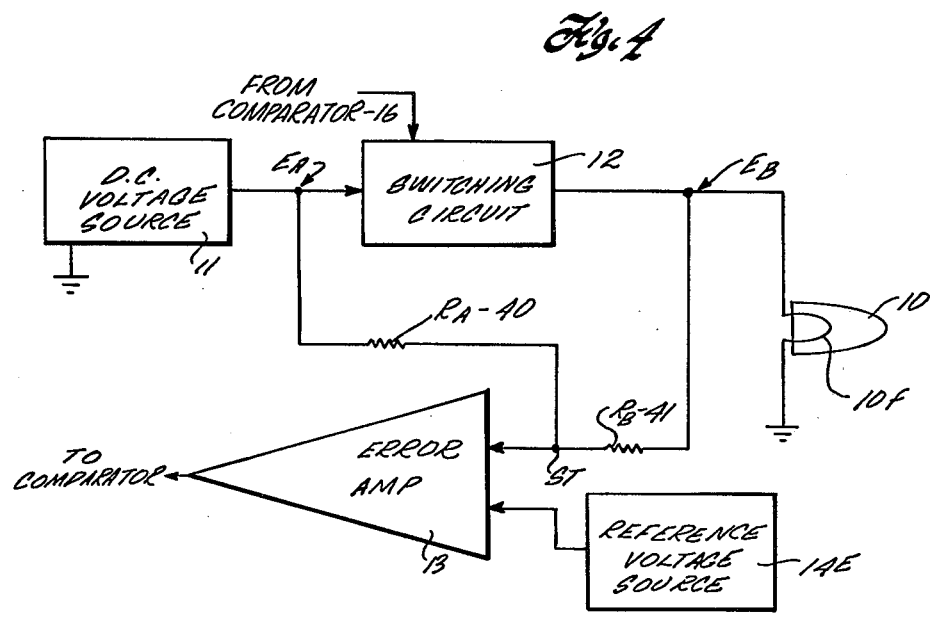
FIG. 4 is a schematic-block diagram of another embodiment of the regulating system of FIG. 1.

Now referring to the drawings, and with particular reference to FIG. 1, the basic concept of the invention utilized in the implementation of its various embodiments will be described in detail. An important aspect in the implementation of the invention is the means for supplying a feedback signal to the regulating system for maintaining a constant luminous flux output from the regulated lamp. The various embodiments of the invention illustrated in FIGS. 3, 4 and 6 all embody the basic concept illustrated in FIG. 1 but implement the means for supplying the feedback signal by different means. The feedback signal utilized in the regulating system for the lamp undergoing regulation represents a lamp electrical operating parameter for signalling the actual voltage applied to the lamp from the power source of a battery. This electrical lamp operating parameter may be either the lamp voltage or the lamp resistance. The embodiments illustrated in FIGS. 3, 4 and 8 provide a lamp voltage feedback signal while the embodiments of FIGS. 1, 6 and 7 employ a lamp resistance feedback signal. With the derivation of the desired feedback signal representative of the lamp electrical operating parameter, the luminous flux output of the lamp undergoing regulation is controlled by varying the duty cycle at which the power is switched on and off to the lamp in response to the feedback signal.

As illustrated in FIG. 1, the lamp 10 undergoing regulation is connected to a DC voltage source 11 by means of an electronic switching circuit 12 connected to control the coupling and decoupling of the DC voltage source to the lamp 10. One terminal of the lamp 10, as well as one terminal of the DC voltage source 11 is connected directly to ground. An error amplifier 13 which may be an operational amplifier has one of its inputs connected to a reference source 14 for comparison with the feedback signal which is representative of the lamp electrical operating parameter. The feedback signal is provided by the lead wire 15 connected between the battery side of the lamp 10 to the negative terminal of the error amplifier 13. The reference source 14 is connected to the positive terminal of the error amplifer 13. The difference between the feedback signal and the reference source signal is amplified in the error amplifier 13. The error amplifier 13 provides a DC signal of a varying magnitude in accordance with the deviations of the feedback signal derived from the lead wire 15, as can be appreciated from examining FIG. 2A. The output signal from the error amplifier 13 is applied to the positive input terminal of the comparator 16. The negative terminal of the comparator 16 is coupled to an AC signal generator 17. The output signal from the AC signal generator normally has a triangular wave shape although it could be sinusoidal. A typical sinusodial wave shape is illustrated in FIG. 1 as the generator output signal, while a triangular shaped signal is illustrated in FIG. 2A. The comparator 16 compares the input signals from the signal generator 17 and the error amplifier 13 and produces a lamp regulating output pulse during the time intervals one of the input signals has a greater instantaneous voltage magnitude than the other input signal thereto. These regulating output pulses from the comparator 16 are applied to the switching circuit 12 for rendering the circuit conductive thereby coupling the power source 11 to the lamp 10. In the absence of a regulating output pulse, the circuit 12 is rendered non-conductive and the lamp 10 is de-energized.

The output signal from the AC signal generator 17 establishes the switching rate that the power source 11 is switched on and off to the lamp. The choice of frequency for the output signal from the signal generator 17 is governed by the thermal time constant exhibited by the lamp 10 so that the switching rate will be fast compared to the thermal time constant but yet slow enough to avoid undue switching losses. Stated differently, the rate the voltage to the lamps is switched on and off should be selected so that the lamp filament does not change temperature appreciably during either the time interval the lamp is energized or de-energized so as to effect the light output of the lamp. A typical switching frequency would be 2 kiloHertz. The regulating pulses are illustrated in FIG. 2B along with their relationship to the signals illustrated in FIG. 2A and thereby graphically illustrate the function of the comparator 16 with regard to turning the switch 12 on and off. In terms of the triangular wave shape illustrated in FIG. 2A, it will be noted that during the initial time interval beginning with time 0 that the error amplifier 13 has an output signal which is at a higher instantaneous voltage level for a preselected time period than the instantaneous voltage level of the AC signal generator 17 output signal and thereby results in the production of a regulating pulse from the comparator 16. The regulating pulse will have a time period corresponding to the time interval during which the error amplifier 13 has an output signal exceeding the magnitude of the voltage of the output signal from the signal generator 17. After this time interval, the triangular wave signal has a magnitude greater than the signal from the error amplifier 13 for a preselected time period during which time period no regulating pulse is derived from the comparator 16 until the signal generator output signal drops to a voltage level below the level of the voltage of the signal from the error amplifier 13 and the sequence continues; see FIG. 2B. The regulating pulses 12 from the comparator 16 applied to the switching circuit 12 are effective for rendering the switching circuit 12 conductive and nonconductive in accordance with the presence or absence of the switching pulses respectively.

The system of the present invention allows the lamps used in present day hazard warning systems to be regulated and one such 6-volt lamp that has been employed is the General Electric 1949 miniature lamp. The use of the G. E. lamp permits a 12-volt DC voltage source to be utilized therewith and thereby results in a significant increase in battery and lamp life when the regulating circuits are implemented in accordance with the teachings of the present invention. From the above description, it should be appreciated that the lamp 10 is regulated to provide the desired constant luminous flux output from the lamp 10 while the DC voltage source 11 degenerates from its rated voltage source to a value about 50 percent of its initial voltage.

One of the important considerations in implementing the concept of the present invention is the consideration of the means for deriving the feedback signal representative of the lamp operating parameter for coupling to the error amplifier 13. A number of methods have been developed and are disclosed hereinafter for producing this desired feedback signal. One method of generating the desired feedback signal is by monitoring lamp voltage. A problem associated with this method is the difference between average voltage and the root mean square, RMS, voltage for a rectangular wave form of voltage such as encountered with a switching regulator. Light output from a lamp is a function of RMS voltage which for a switched voltage is equal to peak voltage times the square root of the duty cycle or as expressed mathematically by Equation 1:

$$E_{rms} = E_{pk} \times (\text{duty cycle})^{\frac{1}{2}} \quad (1)$$

The average most easily sensed and controlled is the average voltage which is equal to peak voltage times the duty cycle as represented in Equation 2:

$$E_{avg} = E_{pk} \times (\text{duty cycle}) \quad (2)$$

Controlling the average voltage to the lamp, however, gives a considerable error in luminous flux output from the lamp.

In FIG. 3, one method of overcoming the duty cycle problem without resorting to an RMS sensing circuit but permitting the use of the average battery voltage is illustrated. In the embodiment illustrated in FIG. 3, an electrical filter is used to filter the pulses derived from the switching circuit 12 for energizing the lamp 10 to thereby couple direct current onto the lamp 10 when it is energized and thereby avoid the duty cycle problem. The electrical filter as illustrated in FIG. 3 comprises the inductor 30 arranged in series circuit with the output from the switching circuit 12 and the power terminal of filament $10_f$ for the lamp 10. The other element of the electrical filter is the capacitor 31 connected between the lamp side of the inductor 30 and ground potential. On the switching circuit end of the inductor 30, or the end opposite capacitor 31, there is connected a diode 32 having its anode electrode directly connected to ground potential. The filter removes the alternating current from the pulse wave form and thereby causes a direct current to flow through the filament $10_f$ for the lamp 10 and avoid the problems associated with employing the average voltage applied to the lamp for regulation purposes.

It will be understood that the remaining portion of the system illustrated in FIG. 3 conforms to the system illustrated in FIG. 1. For this purpose, the reference source 14 generally represented in FIG. 1 comprises a reference source 14E. The voltage provided by the source 14E has been proportioned so that the desired luminous flux will be generated by the lamp 10 when the voltage of the source is within preselected voltage range. The voltage provided by the source 14E is compared with the voltage applied across the lamp 10 by means of the feedback signal provided by the lead wire 33 coupled between the output end of the filter and the input terminal of the error amplifier 13. Accordingly, the feedback signal applied to the error amplifier 13 by means of the lead wire 33 is also a direct current signal representative of lamp voltage.

In FIG. 4 there is illustrated yet another method of avoiding the aforementioned average voltage feedback problem when the feedback signal represents average voltage across the lamp rather than the RMS value. The second method utilizes a signal representative of the average voltage feedback applied across the lamp summed with feedback signals representative of the battery voltage which approximately cancels the error resulting from using average voltage instead of RMS voltage. This circuit arrangement is illustrated in FIG. 4, where resistors $R_A$-40 and $R_B$-41 represent attenuation ratios that are calculated from those formulas 3 and 4 wherein:

$$A = E_{ref}(E_{max}E_{min} - E^2_{min})/E_{min}(E^2_{max} - E^2_{min}) \quad (3)$$

and $$B = E_{ref}(E^2_{max} - E_{max}E_{min})/E_{min}(E^2_{max} - E^2_{min}) \quad (4)$$

In the formulas (3) and (4), $E_{max}$ represents the maximum voltage and $E_{min}$ the minimum voltage at which the lamp is designed to operate. The error resulting from using this approximation is about plus or minus 3 percent for duty cycles ranging from 25 percent to 100 percent.

The voltage signal $E_A$, the voltage source, and the signal $E_B$, the voltage across the lamp 10 are summed in a proportion determined by the attentuation ratios A and B at the terminal ST and compared with the reference voltage source signal provided by the source 14E. Accordingly, the output signal from the error amplifier 13 is corrected or compensated in terms of the summation of these voltage signals to provide the necessary error correction permitting the use of the average voltage instead of the RMS voltage. As in the previous embodiment, the remaining portions of the system illustrated in FIG. 4 operate the same as the basic concept illustrated in FIG. 1.

Figure 5:
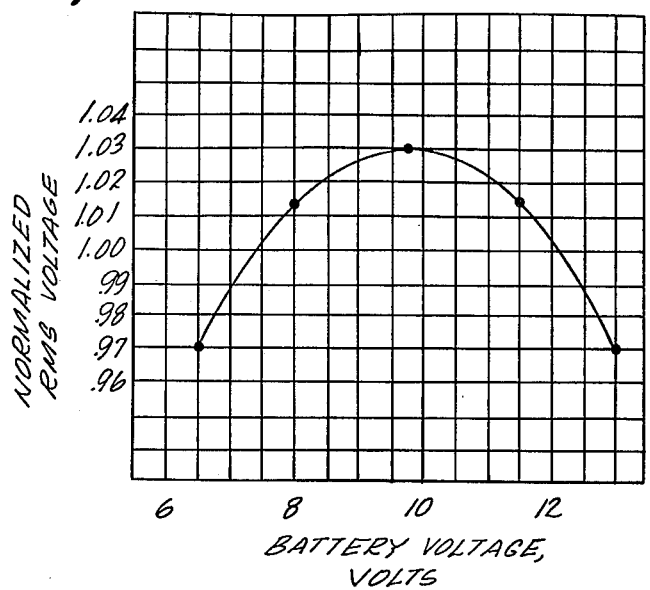
FIG. 5 is a graphical illustration of the RMS voltage of a lamp with varying battery voltages when the regulating system of FIG. 4 is employed therewith.

In FIG. 5, there is graphically illustrated the normalized RMS voltage applied to the lamp 10 with respect to the battery voltage for a regulating system of the type employing the feedback arrangement illustrated in FIG. 4. From this it will be noted that the variations in the RMS voltage applied to the lamp 10 varies very little while the battery varies over a relatively large range. The luminous flux output of the lamp 10 varies approximately ±3 percent for battery voltages that vary from 6.5 to 13 volts.

Figure 6:
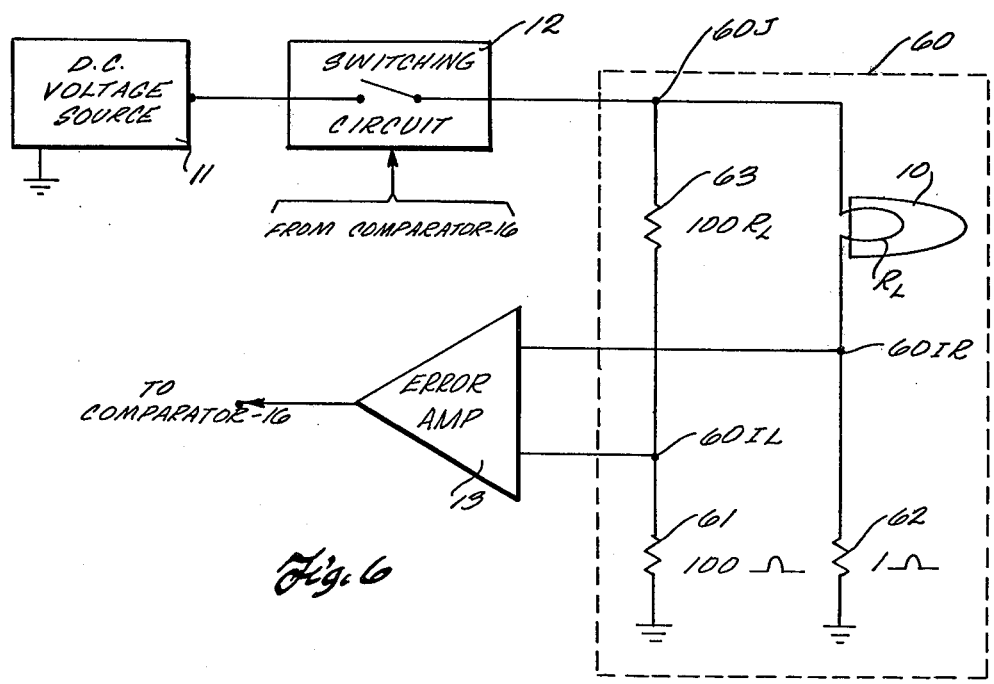
FIG. 6 is a schematic-block diagram of a balanced bridge circuit embodiment of the regulating system illustrated in FIG. 1.

Another method of providing a feedback signal from the lamp without employing a voltage feedback signal is illustrated in FIG. 6. In this arrangement, the feedback signal is a signal representative of the lamp resistance $R_L$ of the lamp 10. In this arrangement, the lamp 10 is arranged in one leg of a balanced bridge circuit 60 for providing the input signals to the error amplifier 13. The bridge 60 comprises three impedance elements arranged in individual legs of the bridge with the lamp 10 arranged in the other leg. The impedance values of the elements arranged in the various legs of the bridge circuit 60 are proportioned relative to the impedance value exhibited by the lamp 10 to provide the balanced bridge condition when the lamp 10 provides the desired luminous flux output. Accordingly, as the lamp resistance $R_L$ varies, the deviations from the balanced condition of the bridge are signalled to the error amplifier 13. The advantage of using the bridge circuit arrangement of FIG. 6 is that the bridge circuit functions both as a reference source and as a feedback source for the associated regulating system. Specifically, the bridge can be readily defined by means of the lamp 10 and three resistive impedance elements. As illustrated in FIG. 6, for example, the two lower legs of the bridge circuit 60 include a resistor 61 in the left-hand leg of the bridge having a resistive impedance value of 100 ohms with a resistor 62 arranged in the opposing leg having a resistive impedance value of 1 ohm. The common junction of the resistive elements 61 and 62 are each connected directly to ground. The lamp 10 is coupled in the upper portion of the bridge circuit 60, as illustrated in FIG. 6, with the lamp connected in series circuit relationship with the resistive element 62 and the power source 11. In the remaining leg of the bridge circuit 60 there is provided a resistor 63 having one terminal connected to the source 11 in common with the lamp 10 and in series circuit relationship with the resistive element 61. The impedance value of the resistive element 63 can be proportioned to be 100 times the resistive value exhibited by the filament of the lamp 10 when emitting the desired luminous flux, or as illustrated in FIG. 6, 100 $R_L$ for defining a balanced condition. The common junction 60J of the bridge circuit 60 is connected directly to receive the pulses from the switching circuit 12. The intermediate junctions of the bridge circuit 60 are the junctions 60-IR and 60-IL and are coupled directly to the individual inputs for the error amplifier 13. The junction 60-IR is identified as the junction between the lamp 10 and the resistor 62. The junction 60-IL is the junction between the resistor 63 and the resistor 61. As in the previous two embodiments, the remaining portion of the regulating system including the bridge circuit arrangement of FIG. 6 operates as discussed in conjunction with FIG. 1.

Now referring to FIG. 7, the complete schematic circuit diagram of the regulator for the lamp 10 in accordance with the bridge feedback technique of FIG. 6 will be described in detail. In this instance, the lamp 10 comprises a commercially available lamp that is employed in present day hazard warning lights and may be a General Electric Model 1949 miniature lamp. This type of lamp is rated for 6-volt operation and 0.125 amps of current. When the General Electric lamp is utilized in the bridge circuit 60, the resistor 63 may have a value of 5.04 kilo ohms to provide a balanced bridge condition with the resistors 61 and 62. For this purpose, the resistor 61 will have 100 ohms of resistance while the resistor 62 will have 1 ohm of resistive impedance.

Figure 7:
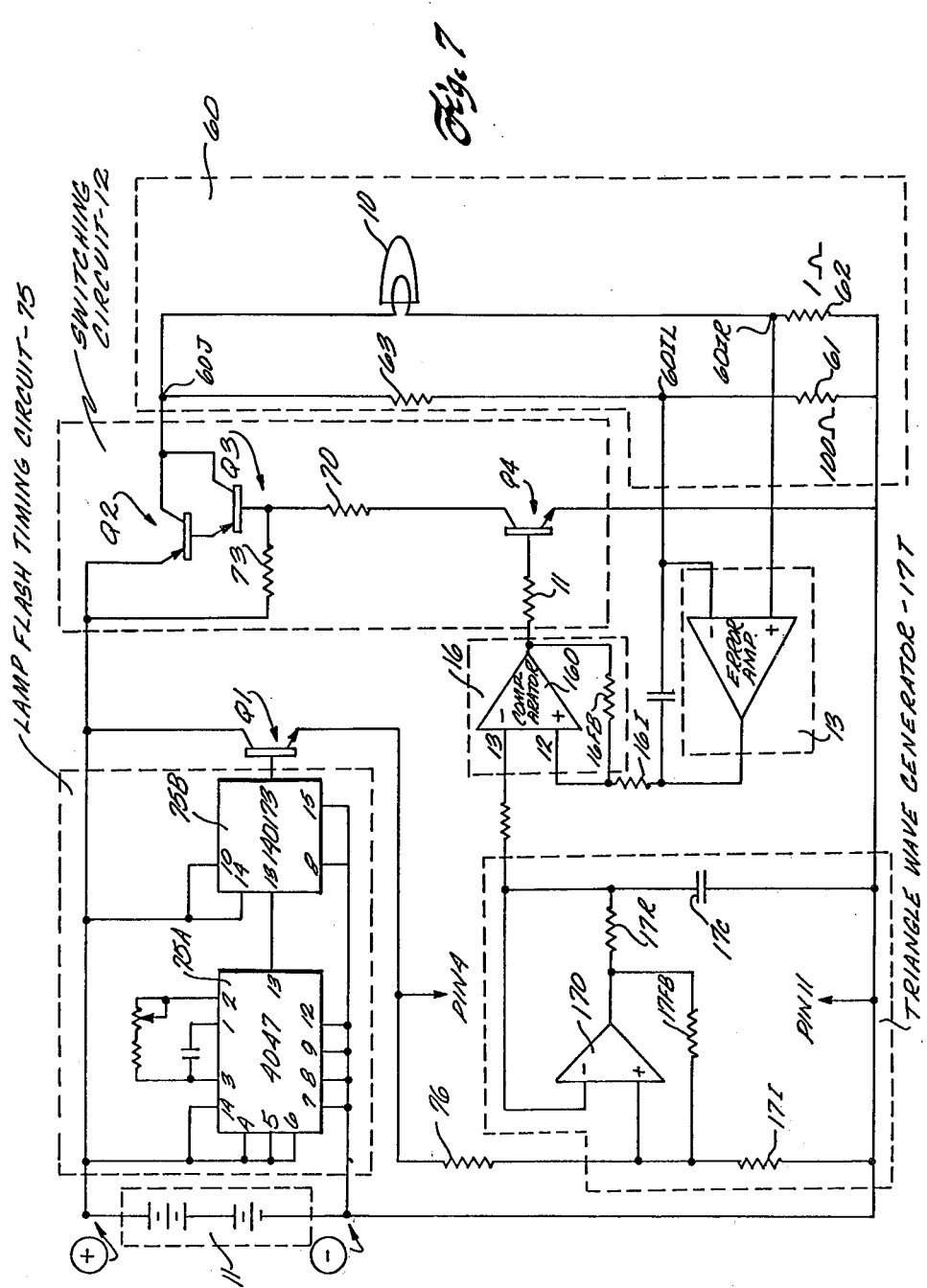
FIG. 7 is a schematic diagram of a complete regulating system utilizing the bridge circuit arrangement illustrated in FIG. 6.
Figure 8:
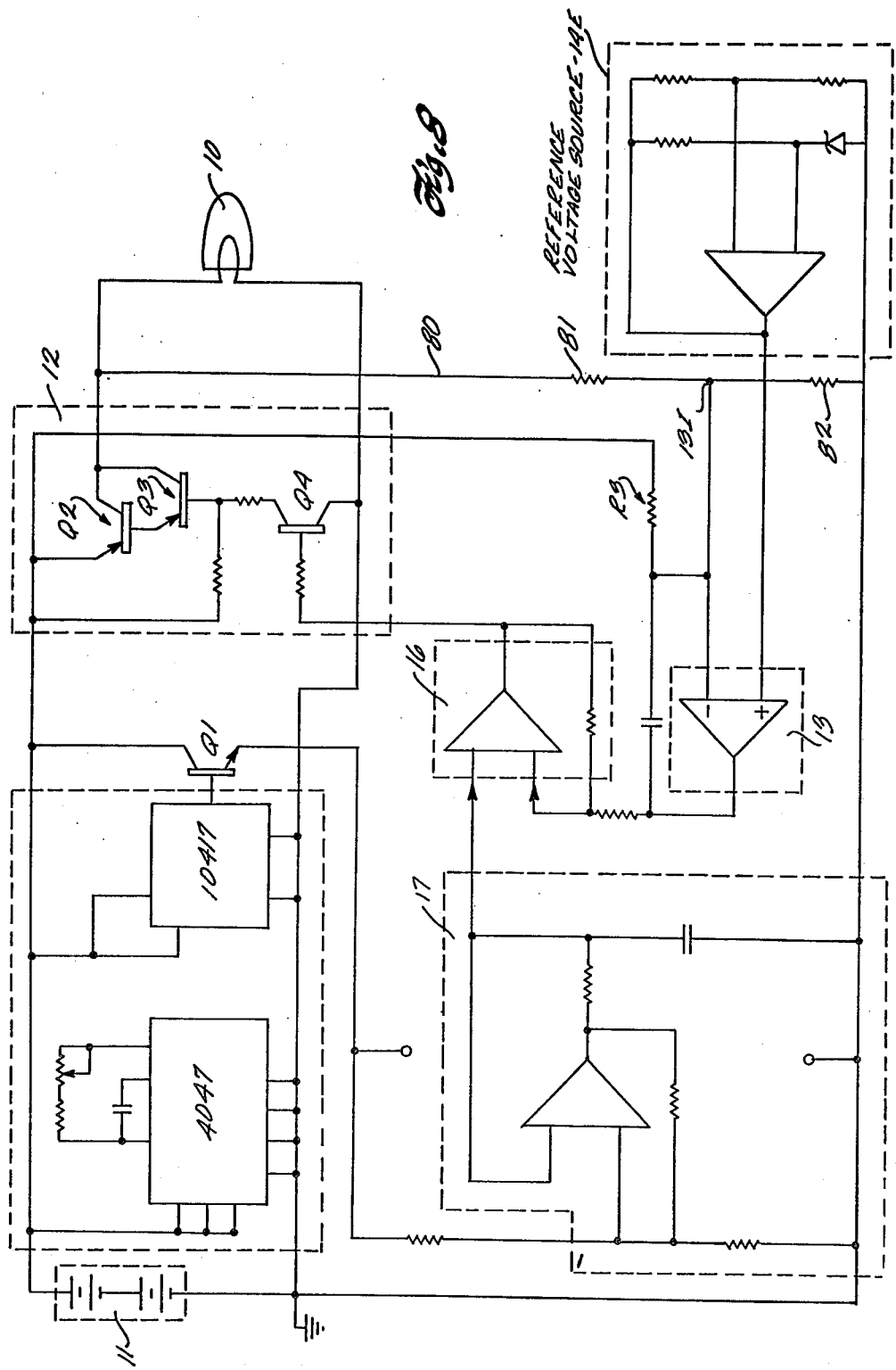
FIG. 8 is a schematic diagram of the basic embodiment of FIG. 1 wherein the lamp feedback is error-corrected by summing it with battery voltage in a desired proportion.

The AC signal generator 17, illustrated in FIG. 7, is a triangular wave generator 17 and comprises an operational amplifier 170 which may be selected from the type commercially available from the National Semiconductor Company of Santa Clara, Calif., and identified as one of its LM124 series quad operational amplifiers. The series of operational amplifiers also includes Models LM224 and LM324. The output circuit of the operational amplifier 170 is coupled in series circuit relationship with the resistor 17R and a parallel output capacitor 17C connected between ground voltage level and the output side of the resistor 17R. The triangular wave is generated through the use of the National Semiconductor operational amplifier by the circuit elements illustrated in FIG. 7 functioning to alternately charge and discharge the output capacitor 17C to continuously generate an output wave form that approximates a triangular configuration. For this purpose, the capacity of the output capacitor 17C may be two nanofarads. The positive (+) input terminal for the amplifier 170 is connected by means of a resistive element 17I to ground level. A feedback resistor 17FB is coupled between the output terminal and the positive input terminal. The negative (−) input terminal for the element 170 is coupled directly to the output end of resistor 17R.

The error amplifier 13 as implemented in the regulating circuit of FIG. 7 may also be selected from the National Semiconductor series of operational amplifiers of either the LM124, LM224 or LM324 types. For the purpose of detecting a signal appearing across the bridge circuit 60 at the junctions 60-IL and 60-IR, the operational amplifier of the LM124 series may be one-fourth of the quad operational amplifier normally provided in an integrated circuit package. The LM124 series of operational amplifiers consist of four independent, high gain, internally frequency compensated operational amplifiers designed specifically to operate from a single power supply over a wide range of voltages. This particular operational amplifier series has been selected for use in the regulating system of the present invention since it has common mode capability extending down to its negative supply voltage which is ground in this application. This is of particular value in regulating circuits of the present invention since the inputs to the error amplifier 13 will go to ground level or to 0 volts when the switching circuit 12 renders the lamp 10 de-energized. The utilization of such commercially available operational amplifiers allows the considerable saving in circuit complexity since no additional offsetting or switching components are required.

The comparator 16 may also be a National Semiconductor operational amplifier of the same LM124 series as the signal generator amplifier 17 and the error amplifier 13 described hereinabove. The amplifier element 160 has its negative (−) input terminal coupled to directly receive the triangular wave output signal from the generator 17. The positive (+) input terminal is coupled to the output terminal of the error amplifier by means of series resistor 161 proportioned to have a relatively high resistance value. A feedback resistor 16FB is coupled between the output terminal of the element 160 and the positive input terminal. The output signals from the comparator 16 are the regulating pulses applied to the switching circuit 12.

The switching circuit 12, as illustrated in FIG. 7, comprises three transistor circuits arranged in a switching configuration to receive the output signal from the comparator 16 for controlling the coupling and decoupling of the power source 11 to the lamp 10. For this purpose, three transistors Q2, Q3 and Q4 are employed. The transistor Q2 is coupled to the power source 11 with its emitter electrode connected to the positive terminal of the source 11 and its collector electrode connected in common with the collector electrode for the transistor Q3 to the input junction 60J of the bridge circuit 60. The base electrode for the transistor Q2 is connected directly to the emitter electrode transistor Q3. The base electrode for the transistor Q3 is coupled to a dropping resistor 70 to the collector electrode for the transistor Q4. The emitter electrode for the transistor Q4 is coupled directly to reference potential or to the negative terminal of source 11. The base electrode for the transistor Q4 is connected to the output terminal of the comparator 16 through a resistor 71. In addition, a resistor 73 is connected between the base electrode for the transistor Q3 and the positive terminal of the source 11 in common with the emitter electrode for the transistor Q2. In this switching arrangement, the circuit 12 normally maintains the lamp 10 in a de-energized condition until the regulation pulses are provided from the comparator 16. Upon receipt of a regulating pulse, the switching circuits 12 are rendered conductive to switchably couple the pulses through the bridge circuit 60 for energizing the lamp 10 for the duration of the time of the regulating pulse. In this configuration of switching transistors the transistor Q2 may be a 2N5193 transistor, while the transistors Q3 and Q4 may be 2N3906 and 2N3904 transistors respectively.

When the lamp 10 is employed as a hazard warning lamp and utilized in a blinking condition or intermittently energized and de-energized in accordance with the present day hazard warning cycles, a timing circuit for controlling the flash intervals is normally provided for the lamp. The timing circuit 75 is illustrated in FIG. 7 as coupled between the power source 11 and the regulating circuits for controlling the coupling and decoupling of the source 11 to the regulating circuits. The lamp flash timing circuit 75 may also be constructed of commercially available integrated circuits and, as illustrated in FIG. 7, the flashing timing circuit 75 comprises an integrated circuit element 75A which may consist of an RCA monostable/astable multivibrator Model CD 4047. As illustrated, the element 75A is connected in an astable multivibrator free-running mode. The output pulses are derived from pin 13 of element 75A and coupled to the counter element 75B. The counter element 75B may be a Motorola Model 140173 decade counter/divider integrated circuit for defining the timing cycle for flashing the lamp 10 on and off. It will be recognized by those skilled in the art that the element 75A provides the pulses to be counted to the element 75B and these pulses are counted by the decade counter/divider for providing an output signal at preselected time intervals for energizing the lamp 10 in accordance with the desired flash rate. For this purpose, the output of the element 75B of the circuit 75 is coupled to a switching transistor Q1. The transistor Q1 is coupled between the positive terminal of the power source and the positive input terminal of the element 170 of the triangular wave generator 17T. As illustrated in FIG. 7, the collector electrode for the transistor Q1 is coupled directly to the positive terminal of the source 11 while the emitter electrode is connected by means of a resistor 76 to the positive input terminal of the amplifier 170 and the positive supply terminal of the LM124. For the flashing time intervals defined by the timing circuit 75, the transistor Q1 is rendered conductive in response to the output pulses from the counter 75B and in this condition the power from the source 11 is supplied to the remaining circuit elements of the regulating circuit. When the power to the regulating circuit is removed, the lamp 10 will become de-energized. It should be recognized at this point that when it is desired to have the lamp continuously energized rather than to be flashed on and off in a warning mode, the flash timing circuit 75 may be omitted.

With the above circuitry in mind, and with reference to the graphical illustrations of FIG. 2, the operation of the complete regulating system can be briefly summarized. Assuming, for the present, that the flash timing circuit circuit 75 is not included in the regulating circuit and that power is continuously supplied to the remaining elements of the system for causing the lamp to continually emit light rays, it will be noted that the lamp 10 will be regulated as a result of the signals derived from the bridge junctions 60-IL and 60-IR of the bridge circuit 60 for applying signals to the inputs to the error amplifier 13. The error signal from the amplifier 13 is coupled as one input to the comparator 16 along with the triangular wave signal from the triangular wave generator 17T. These signals are illustrated in FIG. 2A. The output from the comparator 16 corresponds to the pulse regulating signals illustrated in FIG. 2B. Accordingly, with the application of power to the regulating circuit, the error amplifier 13 will provide an output signal and the triangular wave signal will be generated by generator 17T. As time progresses, the output signals will appear as illustrated in FIG. 2A with the magnitude of the output signal from the error amplifier 13 increasing with decreases in battery or source voltage. The regulating pulses will be generated from the comparator 16 as illustrated in FIG. 2B. These regulating pulses are applied to the switching circuits 12 for rendering the lamp 10 conductive during the time intervals that the regulating pulses are provided from the comparator 16 and accordingly de-energized when the regulating pulses are absent from the comparator 16. As the voltage from the power source 11 degenerates from its initial rated, new battery condition, a signal representing this voltage degeneration is coupled into the error amplifier 13 as a result of the bridge 60 becoming unbalanced. The unbalanced condition of the bridge results due to the decreased voltage across the lamp 10 from its initial condition. The error signal from the amplifier 13 will deviate from its initial magnitude in accordance with the graphical representations in FIG. 2A and cause the time duration of the regulating pulses derived from the comparator 16 to be increased. Accordingly, with the decreases in voltage applied to the lamp 10, the circuit 60 maintains the lamp filament 10f energized for longer periods of time to maintain bridge balance and allow the same amount of luminous flux to be omitted from the lamp 10. This operation is continuous until a duty cycle at 100 percent voltage level is reached. Further operation causes the lamp to emit luminous flux outputs below the desired flux level or the constant level of flux maintained up until the voltage drops below the preselected level. This voltage level is approximately 50 percent of the initial voltage of the battery thereby permitting the battery to be utilized for a substantially longer period of time than heretofore thought possible. It will also be recognized that the source 11 is proportioned to provide an initial voltage of 12 volts to the lamp 10 which is selected to be a 6-volt lamp of the 1949 Model General Electric type. The regulating circuit configuration illustrated in FIG. 7 allows a lamp 10 of a reduced voltage rating to be employed with the 12-volt battery source thereby permitting a significant increase in battery life when the regulating circuit of the present invention is employed.

It should now be recognized that when the lamp 10 is employed in a hazard warning light system and it is desired to flash the lamp on and off, that the lamp timing circuit 75 is included with the regulating system. When the timing circuit 75 is employed, the lamp regulating system will operate as described above except that the lamp will only be energized during certain flash intervals and which intervals are controlled by the timing circuit 75. Under these conditions the transistor Q1 switching circuit will be periodically rendered conductive for powering the regulating system and allow the regulating circuitry to be operative for pulsing the lamp 10 as described hereinabove during the energized periods for the lamp 10.

Now referring to FIG. 8, the schematic circuit diagram of a complete regulating system utilizing the basic voltage sensing regulating technique illustrated in FIGS. 3 and 4 will be described. This regulating system is generally the same from a circuit configuration as illustrated and described in conjunction with FIG. 7. In this arrangement, however, a lamp 10 is not employed in a bridge circuit but in lieu thereof, one of the input terminals of the error amplifier 13 is coupled to a reference voltage source 14E rather than one of the junctions of the bridge circuit 60. As illustrated in FIG. 8, a voltage feedback signal is derived for representing the voltage applied to the lamp 10. This feedback signal is derived through the lead wire 80 coupled to the power side of the lamp 10 in common with the output circuit from the switching circuit 12 through a voltage dividing network coupled to the negative terminal of the source 11. The voltage dividing network comprises the series voltage dropping resistors 81 and 82. The resistive values are proportioned relative to the lamp voltage to provide the desired voltage signal at the junction between the resistors 81 and 82 or the junction 13I. The junction 13I is connected to the negative input terminal of the error amplifier 13.

The reference voltage source 14E provides an accurate DC voltage reference to the error amplifier. In this arrangement, the output circuit of the operational amplifier A4 is arranged for providing the voltage to the positive terminal to the error amplifier 13. An input to the error amplifier 13 from battery voltage through resistor R3 is used to compensate for the difference between RMS and average voltage as previously discussed hereinabove. With these modifications, the general operation of the regulating circuit of FIG. 8 is essentially identical to operation of the system of FIG. 7. The deviations from the desired voltage applied to the lamp 10 are signalled by the amplifier 13 by means of the voltage feedback signals applied through the conductor 80 to the negative input terminal of the amplifier 13.

Figure 9:
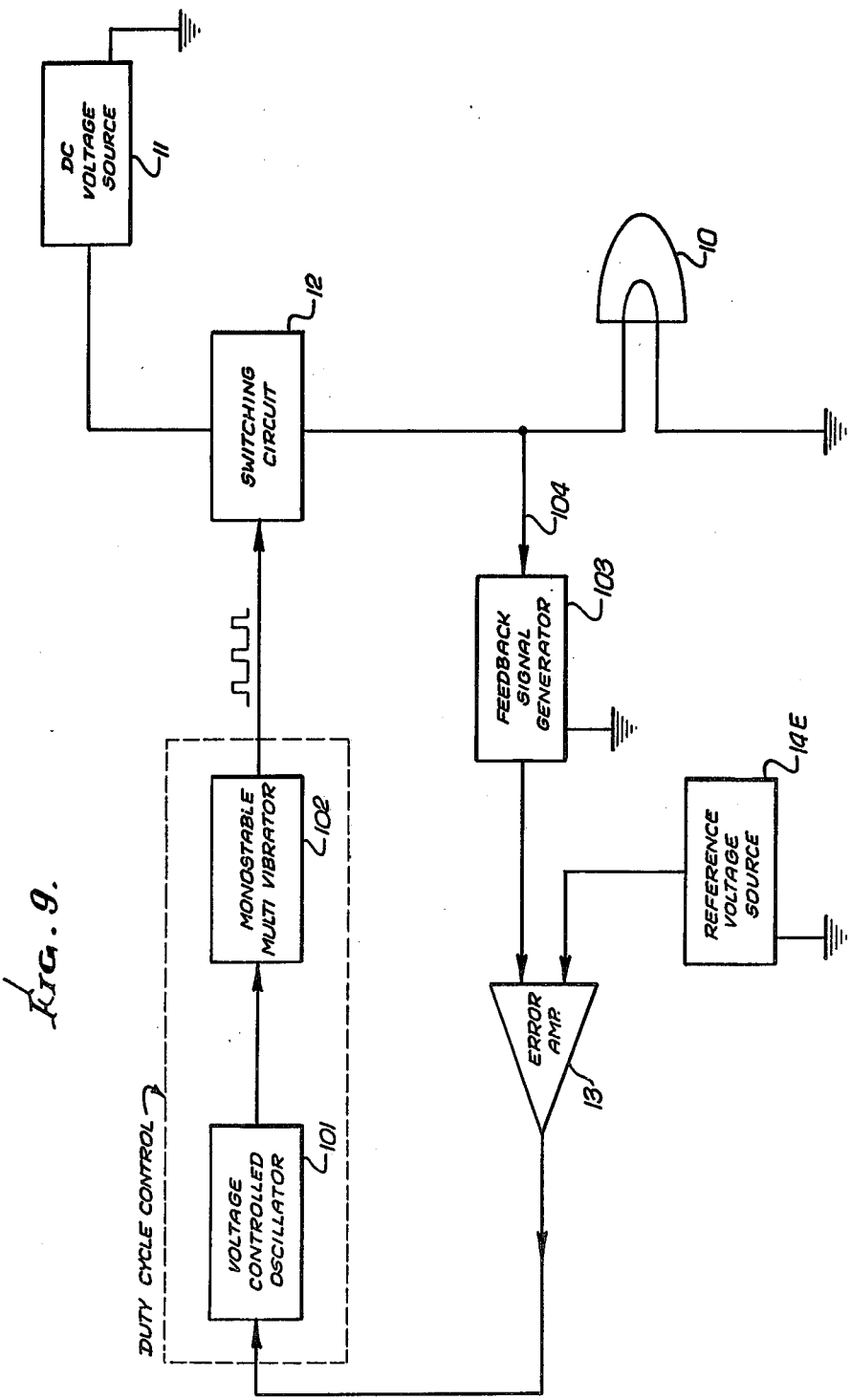
FIG. 9 is a block diagram of another embodiment of the duty cycle control for the energy saving system concept of FIG. 1.

Now referring to FIG. 9, another embodiment of the invention will be disclosed. This regulating system is basically the same system as disclosed hereinabove but differs in that the pulses applied to the switching circuit 12 are produced at a preselected variable rate and having a fixed time duration to maintain a constant luminous flux output from the lamp 10. The duty cycle control circuit in this embodiment comprises a voltage controlled oscillator 101 and a monostable multivibrator 102. As in the previous embodiments, the duty cycle control circuit is coupled to be responsive to the output signal from the error amplifier 13. The feedback signal representative of a lamp electrical operating parameter is coupled to one input of the error amplifier 13 and is denoted by the feedback signal generator illustrated as a block 103. This signal may be a voltage signal representative of the voltage applied to the lamp 10 or any other of the techniques for feedback disclosed herein for sensing a lamp operating parameter. A lead wire 104 is coupled directly to the power side of the lamp 10, as illustrated in FIG. 9, for deriving a voltage feedback signal. Similarly, the reference voltage source 14E is coupled to the other input of the error amplifier 13. The output signal from the error amplifier 13 provides a difference signal representative of the difference between the reference voltage signal and the actual voltage applied to the lamp 10. This error voltage signal is utilized to control the oscillator 101 so that the frequency of the output signal from the oscillator varies in accordance with the magnitude of the output signal from the error amplifier 13. The frequency of the output signal from the oscillator 101 increases with the sensed decreases in the voltage applied to the lamp. This effectively varies the switching rate of the switching circuit 12. The output signal from the oscillator 101, then, controls the monostable multivibrator 102. The monostable multivibrator 102 is coupled to be responsive to the oscillator signal so as to provide output pulses of a fixed time duration whenever the output signal from the oscillator 101 has a preselected voltage level. Accordingly, with the increases in the frequency of the output signal from the oscillator 101, the repetition rate of the pulse generated by the multivibrator 102 will increase so as to produce the necessary variable duty cycle at the switching circuit 12 for switching the power from the source 11 to the lamp 10 to produce the desired result. In this fashion, the lamp 10 is controlled to maintain substantially constant luminous flux output therefrom. It will be recognized to those skilled in the art that the voltage controlled oscillator 101 and the monostable multivibrator 102 employed with this system are well known and commercially available elements. It will also be recognized that it is within the scope of the concept of this invention that the duty cycle control as embodied in FIG. 9 may be utilized with any of the other feedback circuit arrangements disclosed herein.

Figure 10:
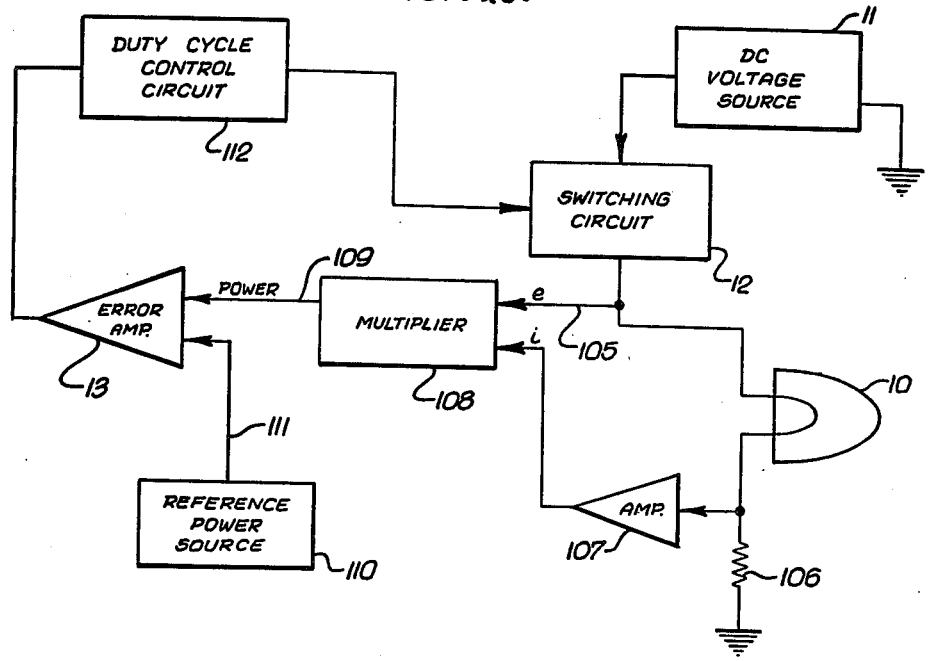
FIG. 10 is a block diagram of a duty cycle lamp control circuit based on sensing the power applied to the lamp.

Now referring to FIG. 10, another embodiment of the regulating system for the lamp will be described wherein the feedback signal is utilized for controlling the luminous output from the lamp 10 based on monitoring the electrical power applied to the lamp. To this end, the lamp 10 is arranged in the same general fashion as disclosed above with DC voltage source 11 coupled to the lamp 10 by means of switching circuit 12. A voltage signal is derived from the lamp circuit by means of the lead wire 105 coupled to the power side of the lamp 10 as illustrated in FIG. 10. A current feedback signal is similarly obtained through the provision of a current sampling resistor 106 coupled in a series circuit relationship with the common side of the lamp 10 or the grounded side as illustrated in FIG. 10. The current sampling resistor 106 may have a small resistance value compared to the lamp resistance value so that the voltage developed across the resistor 106 is an insignificant portion of the applied voltage so as not to effect the integrity of the lamp operation or voltage feedback signal. The voltage developed across the resistor 106 is small and therefore should be amplified by means such as the amplifier 107 to provide a signal representative of the current flowing through the lamp 10. The amplifier 107 is coupled to the lamp side of the resistor 106 and to one of the inputs of an electrical multiplier circuit 108. The output of the amplifying circuit 107 is electrically combined with the voltage feedback signal appearing on the lead wire 105.

The block 108 represents an electrical multiplier which multiplies the current and feedback signals to provide an output signal on the lead wire 109 representative of the power applied to the lamp. Electrical power P is the product of voltage and current: $P = E \times I$. This power output signal on the lead wire 109 is coupled as one input signal to the error amplifier 13. The reference source 110 provides, on its output lead wire 111, a constant voltage indicative of the desired power applied to the lamp for maintaining constant luminous flux output from the lamp 10. As the power to the lamp 10 varies in accordance with the decreases in voltage from the source 11, the signal on the lead wire 109 will decrease and produce a difference signal of increasing amplitude at its output for controlling the duty cycle control circuit 112. The duty cycle control circuit 112 may be the same circuit disclosed in conjunction with FIG. 9 or any of the other above disclosed circuits for controlling the switching circuit 12 for switching the power to the lamp 10 on and off at the desired rates for regulating the luminous flux output from the lamp 10 to maintain it constant.

Figure 11:
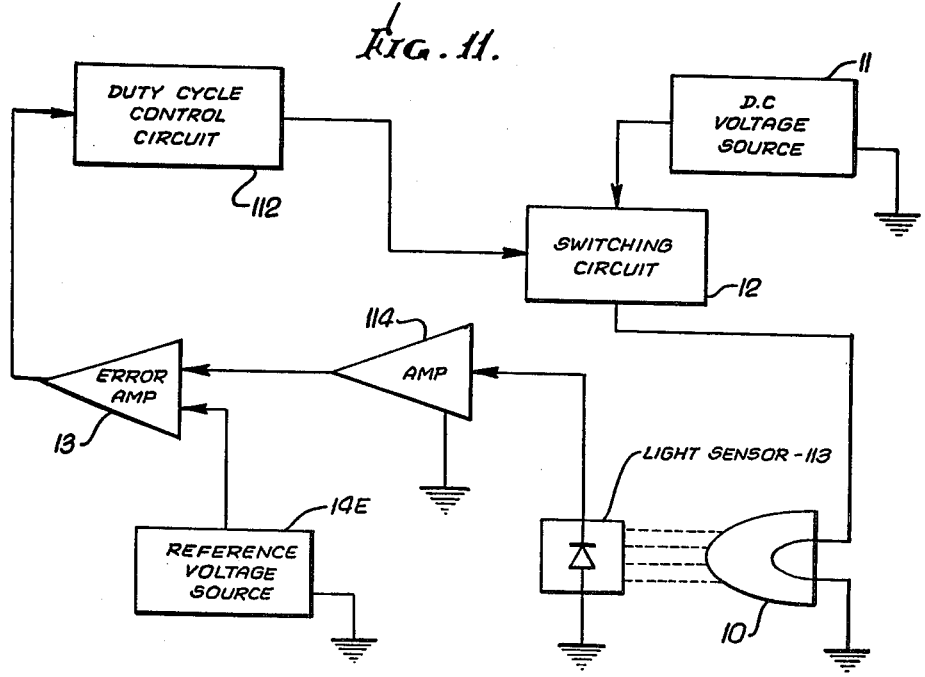
FIG. 11 is a block diagram of a lamp regulating circuit wherein the feedback signal is based on sensing the luminous flux generated by the lamp.

Now referring to FIG. 11, an embodiment of the lamp regulating circuit is illustrated wherein the feedback signal representative of the lamp operating parameter is provided by a light sensor for sensing the luminous flux produced by the lamp 10. The light sensor is identified in FIG. 11 as the element 113, which may be a photodetector arranged adjacent the lamp 10 for receiving the light rays therefrom. The light sensor 113 may be any conventional photoelectric element that is responsive to the light rays impinging thereon from the lamp 10 and producing an electrical output signal in response to the light rays. It will be recognized by those skilled in the art that the output signal from the sensor 113 will produce an electrical output signal based on the intensity of the light rays impinging thereon. The electrical signal will have electrical characteristics depending upon the type of photoelectric cell selected for this purpose. Assuming that a voltage signal is provided from the light sensor 113, the voltage signal is applied to the amplifying circuit 114 for amplification and this amplified voltage signal is applied as one input signal to the amplifier 13. As in the previous embodiments, the other input signal to the error amplifier 13 is provided by the reference source 14E. The difference signal generated by the error amplifier 13 is applied to the duty cycle control element 112 for controlling the switching rate of the switching circuit 12 as in the previous embodiments.

What is claimed is:

1. Apparatus for regulating a DC powered lamp comprising a DC power source having a nominal output voltage exhibiting a decreasing output voltage with time, an incandescent lamp adapted to be coupled to the source to be energized and de-energized therefrom, means for providing a feedback signal from the energized lamp representative of a lamp electrical operating parameter, timing means coupled between the power source and the said means for causing the lamp to be energized and de-energized for preselected time intervals and to render the said means operative during the time inervals the lamp is energized, and switching means coupled between the power source and the lamp for regulating the luminous flux of the lamp to maintain the flux output at a preselected level and substantially constant at said level over relatively large ranges of source voltages as the output voltage from the source degenerates from said nominal output voltage to a voltage level wherein said source is not capable of maintaining said flux output level by switching the source to the lamp on and off at a preselected duty cycle, the initial duty cycle being selected in accordance with the nominal output voltage of said source, the switching means being coupled to be responsive to the feedback signal and said timing means for increasing the switching duty cycle from the initial duty cycle to a 100 percent duty cycle at the source output voltage that is capable of sustaining said flux output level as the power source output voltage degenerates from the nominal voltage to thereby extend the useful life of said DC power source.

2. Apparatus for regulating a DC powered lamp as defined in claim 1 wherein the DC power source comprises battery means.

3. Apparatus for regulating a DC powered lamp as defined in claim 1 including filtering means coupled intermediate the output circuit for the switching means and the lamp.

4. Apparatus for regulating a DC powered lamp as defined in claim 1 wherein said means for providing a feedback signal comprises means for sensing the output voltage of the DC power source and providing a signal representative thereof and means for sensing the average voltage applied to the lamp and providing a signal representative thereof and for combining same with the signal representative of source voltage for providing the feedback signal to the switching means.

5. Apparatus for regulating a DC powered lamp as defined in claim 1 wherein said means for providing a feedback signal comprises an impedance bridge having the lamp arranged in circuit with the bridge and providing an output signal representative of the impedance variations exhibited by the lamp.

6. Apparatus for regulating a DC powered lamp as defined in claim 1 wherein the feedback signal representative of the lamp operating parameter is a signal representative of either lamp voltage or lamp resistance.

7. Apparatus for regulating a DC powered lamp as defined in claim 4 wherein the filtering means comprises an L-C filter.

8. Apparatus for regulating a DC powered lamp comprising a DC power source having a nominal output voltage exhibiting a decreasing output voltage with time, an incandescent lamp adapted to be coupled to the DC power source to be energized and de-energized therefrom, a source of DC reference voltage, means for sensing the voltage applied to the lamp and providing a feedback signal representative thereof, means for comparing the relative magnitudes of the reference voltage source and the lamp voltage and providing a comparison output signal representaive of the lamp voltage deviations from the reference voltage, timing means coupled between the power source and the said means for causing the lamp to be energized and de-energized for preselected time intervals and to render the said means operative during the time intervals the lamp is energized, and switching means coupled between the power source and the lamp for regulating the luminous flux of the lamp to maintain the flux output substantially constant over relatively large ranges of source voltages as the output voltage from the source degenerates from said nominal output voltage to a predetermined lower output voltage level by switching the source to the lamp on and off at a preselected initial duty cycle to a higher duty cycle up to 100 percent in accordance with the desired flux level output and said nominal and lower voltage levels, the switching means being coupled to be responsive to the comparison output signal and said timing means for increasing the switching duty cycle to compensate for the reduced output voltage of said source for maintaining a constant luminous flux output from the lamp as the power souce output voltage degenerates from the nominal voltage to said predetermined voltage level.

9. Apparatus for regulating a DC powered lamp as defined in claim 8 including filter means coupled between the lamp and the output circuit of said switching means to provide a direct current to the lamp.

10. Apparatus for regulating a DC powered lamp as defined in claim 8 including means for sensing the power source voltage, means for sensing the average voltage applied to the lamp, means for summing the signals from each of said means and coupling the resultant signal to the comparison means.

11. Apparatus for regulating a DC powered lamp comprising a DC power source having a nominal output voltage exhibiting a decreasing output voltage with time, a lamp adapted to be coupled to the source to be energized and de-energized therefrom, a source of DC reference potential, means for sensing the voltage applied to the lamp to provide a feedback signal from the energized lamp representative of a lamp operating parameter, an error amplifier having an input circuit coupled to the source of reference potential and an input circuit coupled to be responsive to the feedback signal and providing an output signal representative of the deviations of the voltage applied to the lamp, oscillating signal generating means providing an output signal having a preselected wave shape exhibiting reversals in direction regularly and continually, and comparison circuit means coupled to be responsive to the output signal from the signal generating means and the output signal from the error amplifier and providing an output signal for switching the power source on and off in accordance with the instantaneous relative magnitudes of the signals applied thereto, the output signal from said comparison circuit providing a switching output signal defined for providing a preselected switching rate at said nominal output voltage of said source and a switching output signal for increasing the switching rate as the voltage level of said source decreases, said preselected switching rate being selected on the basis of said nominal output voltage of said source and the desired light flux from the lamp and the increased switching rate being selected in accordance with said desired light flux and the lower voltage level capable of sustaining said light level.

12. Apparatus for regulating a DC powered lamp as defined in claim 11 including filter means coupled between the lamp and the output circuit of said comparison means for providing a DC current through the lamp.

13. Apparatus for regulating a DC powered lamp as defined in claim 12 wherein the filter means comprises an L-C filter.

14. Apparatus for regulating a DC powered lamp as defined in claim 11 wherein said sensing means comprises means for sensing the output voltage of the DC power source and providing a signal representative thereof and means for sensing the average voltage applied to the lamp and providing a signal representative thereof and for combining same with the signal representative of source voltage for providing the feedback signal to the switching means.

15. Apparatus for regulating a DC powered lamp as defined in claim 11 wherein the signal generating means provides a triangular shaped output signal.

16. Apparatus for regulating a DC powered lamp as defined in claim 11 including switching circuit means coupled between the DC source and the lamp and coupled to be responsive to the output signal from the comparison means.

17. Apparatus for regulating a DC powered lamp as defined in claim 16 wherein the DC power source comprises battery means.

18. Apparatus for regulating a DC powered lamp as defined in claim 17 including timing circuit means for controlling the time intervals that the lamp is energized and de-energized to cause the lamp to flash on and off at a preselected rate and flash period.

19. A regulating system for a DC powered lamp comprising a bridge circuit having an impedance means of preselected impedance value arranged in three legs of the bridge circuit and a lamp to be regulated connected in the fourth leg of the bridge circuit, the value of the impedance means in each of the three legs being proportioned relative to the impedance exhibited by the lamp to be regulated to provide a balanced bridge condition when the energized lamp produces a preselected luminous flux output, error amplifying means having its input circuits connected across the opposite junctions between each pair of legs of the bridge circuits for detecting the deviations in impedance exhibited by the lamp and providing an amplified, continuous output signal in accordance with the sensed deviations oscillating signal generating means providing an output signal of a preselected wave shape exhibiting reversals in direction regularly and continually, comparison means coupled to be responsive to the output signal from the signal generating means and the error amplifying means and for providing a lamp regulating output signal pulse during the time intervals the output signals from the error amplifying means has a greater voltage magnitude than the input signal from the signal generating means, and a source of direct current voltage which can be alternately coupled to and decoupled from the remaining pair of junctions which are common to each pair of legs of the bridge circuit for powering the bridge circuit, an electrical switching circuit means coupled to be responsive to the lamp regulating output signal pulses and coupled between the source of voltage and said remaining pair of junctions of the bridge circuit for coupling the power source to the bridge circuit in accordance with the reception of a regulating signal pulse and for decoupling the power source in the absence of a regulating signal pulse.

20. A regulating system for a DC powered lamp as defined in claim 19 wherein the impedance means in the three legs of the bridge circuit each comprise a resistance element.

21. A regulating system for a DC powered lamp as defined in claim 20 wherein the resistance element arranged in one leg of the bridge circuit opposite the bridge leg having the lamp to be regulated connected therein has its resistance value proportioned in accordance with the resistance exhibited by the lamp when emitting the desired luminous flux.

22. A regulating system for a DC powered lamp as defined in claim 21 wherein the lamp is an incandescent filament lamp.

23. A regulating system for a DC powered lamp as defined in claim 22 wherein the lamp is rated for operation at a substantially lower voltage than the nominal voltage of the direct current source.

24. A regulating system for a DC powered lamp as defined in claim 19 wherein the DC source comprises battery means.

25. A regulating system for a DC powered lamp as defined in claim 26 wherein the battery means provides approximately 12 volts and the lamp is rated for 6-volt operation.

26. A regulating system for a DC powered lamp as defined in claim 19 wherein said lamp is a filament lamp and the frequency of the output signal provided by the oscillating signal generating means is selected relative to the thermal time constant of the lamp so that the time period for one cycle of the output signal is relatively short so that the lamp filament does not change temperature significantly during the on and off time periods of the lamp but yet the frequency is sufficiently low enough for avoiding significant switching losses.

27. A regulating system for a DC powered lamp as defined in claim 26 wherein the signal generating means provides a triangular shaped output signal having a frequency on the order of two kiloHertz.

28. A regulating system for a DC powered lamp as defined in claim 19 wherein the error amplifier is further characterized as having a common mode capability.

29. A regulating system for a DC powered lamp as defined in claim 28 wherein the error amplifier comprises a National Semiconductor Model LM124, LM224 or LM324 operational amplifiers.

30. A regulating system for a DC powered lamp as defined in claim 19 including timing circuit means for controlling the time intervals that the lamp is energized and de-energized to cause the lamp to flash on and off at a preselected rate and flash period.

31. A method of maintaining the luminous flux output of a DC powered lamp substantially constant with variations in the voltage output of the power source from an initial voltage level to a preselected lower voltage level including the steps of sensing the actual voltage applied to the lamp by providing a feedback signal from the energized lamp representative of a lamp electrical operating parameter, comparing the lamp feedback signal with a reference electrical signal proportioned to maintain the luminous flux output at a preselected luminous flux output and providing a comparison output signal representative of any deviations between the feedback signal and the reference signal, timing means coupled between the power source and the said means for causing the lamp to be energized and de-energized for preselected time intervals and to render the said means operative during the time intervals the lamp is energized, and switching the power source to the lamp on and off at a duty cycle proportional to the initial magnitude of the comparison output signal and said timing, means to compensate for the voltage variations of the DC power source by increasing the duty cycle for maintaining a substantially constant flux output from the lamp over a relatively wide range of voltage variations represented by the range from said initial voltage level to a preselected lower voltage level.

32. A method of maintaining the luminous flux output of a DC powered lamp as defined in claim 32 wherein the step of switching the power source to the lamp on and off includes the steps of providing an oscillator having an output signal of a preselected wave shape exhibiting reversals in direction regularly and continually, and comparing the relative magnitudes of the voltages of the output signal from the oscillator and said comparison signal and providing an output regulating signal for switching the power source off during the time intervals one of the signals has a voltage magnitude greater than the other signal.

33. A method of maintaining the luminous flux output of a DC powered lamp as defined in claim 32 wherein the oscillator provides an output signal having a substantially triangular wave shape varying about a preselected reference voltage level and wherein said output regulating signal is effective for decoupling the power source from the lamp during the time intervals the triangular output signal has a larger voltage level than the comparison signal.

34. A method of maintaining the luminous flux output of a DC powered lamp as defined in claim 32 including providing an electronic switching circuit coupled to be responsive to said output regulating signal for controlling the coupling of the power source to the lamp in accordance therewith.

35. A method of maintaining the luminous flux output of a DC powered lamp as defined in claim 33 including providing an electronic switching circuit coupled to be responsive to said output regulating signal for controlling the coupling of the power source to the lamp in accordance therewith.

36. A method of maintaining the luminous flux output of a DC powered lamp substantially constant with variations in the voltage output of the power source including the steps of arranging the lamp to be regulated in one leg of a bridge circuit, proportioning the impedance elements of the three other legs of the bridge circuit in accordance with the impedance exhibited by the lamp for providing a preselected luminous flux output from the lamp for defining a balanced bridge condition, sensing any deviations in the balanced condition of the bridge circuit and providing an output signal representative thereof, causing the lamp to be energized and de-energized for preselected time intervals from timing means, switching the power to the lamp on and off at a controlled and variable duty cycle in accordance with the deviations represented by the output signal and the timing means to regulate the lamp voltage during the time intervals the lamp is energized.

37. A method of maintaining the luminous flux output of a DC powered lamp as defined in claim 38 wherein the step of switching the power source to the lamp on and off and the step of timing the lamp to be energized and de-energized for preselected time intervals includes the steps of providing an oscillator having an output signal of a preselected wave shape exhibiting reversals in direction regularly and continually, and comparing the relative magnitudes of the voltages of the output signal from the oscillator and said deviation signal and providing an output regulating signal for switching the power source off during the time intervals one of the signals has a voltage magnitude greater than the other signal.

38. A method of maintaining the luminous flux output of a DC powered lamp as defined in claim 36 wherein the oscillator provides an output signal having a substantially triangular wave shape varying about a preselected reference voltage level and wherein said output regulating signal is effective for decoupling the power source from the lamp during the time intervals the triangular output signal has a larger voltage level than the deviation signal.

39. A method of maintaining the luminous flux output of a DC powered lamp as defined in claim 36 including providing an electronic switching circuit coupled to be responsive to said output regulating signal for controlling the coupling of the power source to the lamp in accordance therewith.

40. A method for regulating the voltage applied to a lamp including the steps of providing a DC powered lamp with a DC power source having a nominal output voltage exhibiting a decreasing output voltage with time, deriving a feedback signal representative of a preselected electrical operating parameter of the lamp, comparing the feedback signal with a reference signal representative of the same operating parameter and providing a difference signal representative of the change in the operating parameter with changes in battery voltage, providing an alternating current oscillator having a preselected frequency selected relative to the thermal time constant of the lamp to be relatively high in switching rate but low enough in switching rate for avoiding significant switching losses, the oscillator providing an output signal of a preselected output waveform, comparing the relative amplitudes of the output waveform from the oscillator and the difference signal and providing an output lamp switching signal for switchably controlling the coupling of the battery voltage for energizing and de-energizing the lamp for preselected time intervals in accordance with the relative magnitudes of the compared signals, and switchably controlling the coupling of the battery voltage to the lamp at an initial switching rate in accordance with the nominal output voltage of said source and at proportioned increasing switching rates as said source voltage degenerates from said nominal output voltage.

41. Apparatus for regulating a DC powered lamp as defined in claim 1 wherein the switching means comprises means for switching the source to the lamp at a preselected, fixed repetition rate and for variable time durations in order to vary the duty cycle in accordance with said feedback signal.

42. Apparatus for regulating a DC powered lamp as defined in claim 1 wherein the switching means comprises means for switching the source to the lamp at a variable repetition rate for a preselected fixed time duration in order to vary the duty cycle in accordance with said feedback signal.

43. Apparatus for regulating a DC powered lamp as defined in claim 1 wherein said means for providing a feedback signal provides a signal representative of the electrical power applied to the energized lamp.

44. Apparatus for regulating a DC powered lamp as defined in claim 43 wherein said feedback means comprises means for sensing the voltage and current applied to the energized lamp to provide electrical signals representative thereof and means for electrically combining said signals for representing the power applied to the energized lamp.

45. Apparatus for regulating a DC powered lamp as defined in claim 44 wherein said means for combining the signals comprises multiplication means coupled to be responsive to the electrical signals representative of voltage and current and providing an output signal representative of the power applied to the energized lamp.

46. A method for regulating the voltage applied to a lamp as defined in claim 40 wherein the step of comparing to provide a lamp switching signal is further characterized as energizing and de-energizing the lamp at a preselected fixed rate and for variable time durations.

47. A method for regulating the voltage applied to a lamp as defined in claim 40 wherein the step of comparing to provide a lamp switching signal is further characterized as energizing and de-energizing the lamp at a variable repetition rate for preselected, fixed time durations.

48. A method for regulating the voltage applied to a lamp as defined in claim 40 wherein the step of deriving a feedback signal includes the step of sensing the luminous flux output of the lamp and providing an electrical signal representative thereof for deriving said feedback signal.

49. A method for regulating the voltage applied to a lamp as defined in claim 48 wherein the step of sensing the luminous flux output includes the step of arranging a light sensor adjacent the lamp for sensing the luminous flux output of the lamp and providing an electrical output signal representative of the sensed luminous flux.

50. Apparatus for regulating a DC powered lamp comprising
a DC power source having a nominal output voltage exhibiting a decreasing output voltage with time
a lamp adapted to be coupled to the source to be energized and de-energized therefrom,
a source of accurate DC reference potential,
means for sensing an operating parameter of the lamp to provide a feedback signal from the energized lamp representative of the sensed lamp operating parameter,
an error amplifier having an input circuit coupled to said source of reference potential and an input circuit coupled to be responsive to the feedback signal and providing an output signal representative of the deviations in the voltage applied to the lamp, timing means coupled between the power source and the said means for causing the lamp to be energized and de-energized for preselected time intervals and to render the said means operative during the time intervals the lamp is energized, and
duty cycle control means coupled to be responsive to the output signal from the error amplifier and said timing means providing an output signal for switching the power sorce on and off at a preselected initial rate proportioned in accordance with said nominal output voltage and in response to the instantaneous relative magnitude of the error signals applied thereto for regulating the luminous flux of the lamp to maintain the flux output substantially constant over relatively large ranges of source voltages as the output voltage from the source degenerates from said nominal voltage to a preselected lower voltage level by switching the source to the lamp on and off at a preselected rate and for preselected time durations.

51. Apparatus for regulating a DC powered lamp as defined in claim 50 wherein the duty cycle control means comprises means for providing output signals of a preselected fixed repetition rate and of variable time duration.

52. Apparatus for regulating a DC powered lamp as defined in claim 50 wherein the duty cycle control means comprises means for providing output signals of a preselected fixed time duration and variable repetition rate.

53. Apparatus for regulating a DC powered lamp as defined in claim 50 wherein the duty cycle control means comprises oscillator means coupled to be responsive to the error amplifying means for providing output signals having a variable frequency in accordance with the magnitude of the error amplifier output signals, and pulse signal generating means coupled to be responsive to the oscillator output signals for periodically providing pulse output signals of a preselected fixed time duraion in response to the signals from the oscillator means having a preselected magnitude.

54. Apparatus for regulating a DC powered lamp as defined in claim 53 wherein the oscillator means comprises a voltage controlled oscillator means and the pulse signal generating means comprises a monostable multivibrator.

55. Apparatus for regulating a DC powered lamp as defined in claim 50 wherein the sensing means comprises means for sensing the power applied to the energized lamp and providing an output signal representative of the power, and the reference potential provides a reference signal representative of the power for maintaining the luminous flux output of the lamp substantially constant.

56. Apparatus for regulating a DC powered lamp as defined in claim 55 wherein the sensing means comprises means for sensing the voltage applied to the lamp and providing an electrical signal representative thereof, means for sensing the current applied to the energized lamp and for providing an electrical signal representative thereof, and electrical means for multiplying the voltage and current signals for providing an output signal representative of the power applied to the lamp.

57. Apparatus for regulating a DC powered lamp as defined in claim 50 wherein the sensing means comprises means for sensing the luminous flux output of the energized lamp and providing an electrical signal representative thereof.

58. Apparatus for regulating a DC powered lamp as defined in claim 57 wherein said sensing means comprises a photoelectric sensor arranged adjacent the lamp for responding to the light rays impinging thereon from the lamp.

59. A method for regulating the voltage applied to a lamp including the steps of
providing a DC powered lamp and a DC source exhibiting a decreasing output voltage with time from an initial value to a preselected lower level on the order of 50 percent of said initial level,
deriving a feedback signal representative of a preselected operating parameter of the lamp,
comparing the feedback signal with a reference signal representative of the same operating parameter of the lamp for maintaining a constant luminous flux output for the lamp and providing a control signal representative of any difference in the operating parameter with the decreasing values of the DC power applied to the lamp, causing the lamp to be energized and de-energized for preselected time intervals from timing means,
switching the DC source to the lamp on and off at a preselected duty cycle in accordance with the comparison step and the timing of the lamp and at increasing duty cycles up to 100 percent duty cycles in accordance with the reduced voltage levels, the switching being at a preselected repetition rate and for preselected time durations for continuously maintaining a constant luminous flux output from the lamp as the DC source voltage decreases to a voltage level capable of providing the constant luminous flux output at a 100 percent duty cycle.

60. A method for regulating the voltage applied to a lamp as defined in claim 59 wherein the step of deriving a feedback signal comprises providing a signal representative of the power applied to the lamp.

61. A method for regulating the voltage applied to a lamp as defined in claim 59 wherein the step of deriving a feedback signal comprises providing a signal representative of the luminous flux generated by the lamp while energized.

62. Apparatus for a DC powered lamp comprising
a DC power source having a nominal output voltage exhibiting a decreasing output voltage with time,
a lamp adapted to be coupled to the source to be energized and de-energized therefrom,
means for providing a signal representative of a lamp electrical operating parameter, timing means coupled between the power source and the said means for causing the lamp to be energized and de-energized for preselected time intervals and to render the said means operative during the time intervals the lamp is energized, and switching means coupled between the power source and the lamp for the luminous flux of the lamp to maintain the flux output substantially constant over relatively large ranges of source voltages as the output voltage from the source degenerates from said nominal output voltage to a preselected lower voltage level by switching the source to the lamp on and off at a preselected rate, the switching means being coupled to be responsive to the lamp operating parametersignal and said timing means for increasing the switching duty cycle up to a 100 percent duty cycle for maintaining a constant luminous flux output from the lamp as the power sorce output voltage degenerates from the nominal voltage to said lower voltage level, the duty cycle at said lower voltage level being 100 percent.

63. Apparatus for regulating a DC powered lamp as defined in claim 62 including further timing means coupled between the power source and the regulating means for causing the lamp to be energized and de-energized for preselected time intervals and to render the regulating means operative during the time intervals the lamp is energized.

64. Apparatus for regulating a DC powered lamp as defined in claim 62 wherein the signal representative of a lamp operating parameter is representative of the lamp voltage.

65. Apparatus for regulating a DC powered lamp as defined in claim 62 wherein the DC power source is a self-contained battery.

66. Apparatus for regulating a DC powered lamp comprising a DC power source having a nominal output voltage exhibiting a decreasing output voltage with time t6 a preselected lower voltage, an incandescent filament lamp having a preselected voltage rating substantially the same as said source lower voltage adapted to be coupled to the source to be energized and de-energized therefrom, means for providing a signal representative of the lamp operating voltage, switching means coupled between the power source and the lamp for regulating the luminous flux of the lamp to maintain the flux output substantially constant over relatively large ranges of source voltages as the output voltage from the source degenerates from said nominal voltage to a preselected substantially lower voltage by switching the source to the lamp on and off at a preselected rate, the switching means being coupled to be responsive to the lamp operating voltage signal and said timing means for increasing the switching duty cycle for maintaining a constant luminous flux output from the lamp as the power source output voltage degenerates from the nominal voltage to said preselected lower voltage.

67. Apparatus for regulating a DC powered lamp as defined in claim 66 wherein the DC power source comprises battery means.

68. Apparatus for regulating a DC powered lamp as defined in claim 66 including further timing means coupled between the power source and the regulating means for causing the lamp to be energized and de-energized for preselected time intervals and to render the regulating means operative during the time intervals the lamp is energized.

69. A method for regulating the voltage applied to a lamp including the steps of providing a DC powered lamp powered by a source exhibiting a decreasing output voltage with time, deriving a signal representative of the operating voltage of the lamp, comparing the operating voltage signal with a reference signal representative of the operating voltage of the lamp for maintaining a constant luminous flux output for the lamp and providing a switching control signal representative of any difference in the compared signals with changes in the DC power to the lamp, causing the lamp to be energized and de-energized for preselected time intervals from timing means.

switching the DC power to the lamp on and off at a preselected duty cycle in accordance with the comparison step and the timing step, the duty cycle being increased in accordance with the decreasing source voltage and with the switching being at a preselected repetition rate and for preselected time durations for continuously maintaining a constant luminous flux output from the lamp as the DC source voltage decreases.

70. Apparatus for regulating a DC powered lamp as defined in claim 1 wherein the nominal output voltage of said DC power source has an output voltage represented as X volts and said lamp has a rated voltage substantially less than X.

71. Apparatus for regulating a DC powered lamp as defined in claim 70 wherein the lamp rated voltage is on the order of one-half of said X volts.

72. Apparatus for regulating a DC powered lamp as defined in claim 50 wherein the nominal output voltage of said DC power source has an output voltage represented as X volts and said lamp has a rated voltage substantially less than X.

73. Apparatus for regulating a DC powered lamp as defined in claim 62 wherein the nominal output voltage of said DC power source has an output voltage represented as X volts and said lamp has a rated voltage substantially less than X.

74. Apparatus for regulating a DC powered lamp as defined in claim 66 wherein the nominal output voltage of said DC power source has an output voltage represented by X volts and the preselected voltage rating of the incandescent filament lamp is on the order of one-half of X volts.

75. Apparatus for regulating the light output of an electrical lamp comprising a power source having a nominal output voltage exhibiting a decreasing output voltage with time, a lamp adapted to be coupled to the source to be energized and de-energized therefrom, timing means coupled between the power source and the said means for causing the lamp to be energized and de-energized for preselected time intervals and to render the said means operative during the time intervals the lamp is energized, and means for switchably coupling the power source to the lamp in response to the timing means for regulating the luminous flux output of the lamp to maintain the flux output substantially constant over a large range of source voltages as the output voltage from the source degenerates from said nominal output voltage to a preselected lower voltage level by switching the source to the lamp on and off at a preselected duty cycle based on the nominal output of said source to a 100 percent duty cycle based on the preselected lower voltage level.

76. Apparatus for regulating the light output of an electrical lamp as defined in claim 75 including further means coupled between the power source and said regulating means for causing the lamp to be energized and de-energized for preselected time intervals and to render the regulating means operative during the time intervals the lamp is energized.

77. Apparatus for regulating the light output of an electrical lamp as defined in claim 76 wherein said power source comprises battery means having a nominal output voltage of 12 volts and said lamp has a voltage rating of approximately 6 volts.

78. Apparatus for regulating the light output of an electrical lamp as defined in claim 75 wherein said switching means provides pulses at a rate of approximately 2 kilohertz.

* * * * *

UNITED STATES PATENT OFFICE
CERTIFICATE OF CORRECTION

Patent No. 4,156,166          Dated May 22, 1979

Inventor(s) Haskell Shapiro and Robert C. Kilpatrick

It is certified that error appears in the above-identified patent and that said Letters Patent are hereby corrected as shown below:

Col. 5, line 49, change "average" to --voltage--

Col. 7, line 5, after "battery" insert --voltage--

Col. 14, Claim 1, line 10, change "said" to --regulating--

Col. 14, Claim 1, line 12, change "said" to --regulating--

Col. 15, Claim 8, line 12, change "said" to --regulating--

Col. 15, Claim 8, line 14, change "said" to --regulating--

Col. 15, Claim 8, line 32, change "souce" to --source--

Col. 17, Claim 25, line 42, change "26" to --24--

Col. 18, Claim 31, line 19, change "said" to --regulating--

Col. 18, Claim 31, line 21, change "said" to --regulating--

Col. 18, Claim 32, line 34, change "32" to --31--

Col. 19, Claim 37, line 21, change "38" to --36--

Col. 21, Claim 53, lines 55 & 56, change "duraion" to --duration--

Col. 23, Claim 62, line 16, change "sorce" to --source--

Col. 23, Claim 66, line 38, change "t6" to --to--

UNITED STATES PATENT OFFICE
CERTIFICATE OF CORRECTION

Patent No. 4,156,166　　　　Dated May 22, 1979

Inventor(s) Haskell Shapiro and Robert C. Kilpatrick

It is certified that error appears in the above-identified patent and that said Letters Patent are hereby corrected as shown below:

Col. 23, Claim 66, line 45, after "voltage" insert

--timing means coupled between the power source and the means for causing the lamp to be energized and de-energized for preselected time intervals and to render said means operative during the time intervals the lamp is energized, and --

Signed and Sealed this

First Day of January 1980

[SEAL]

Attest:

SIDNEY A. DIAMOND

Attesting Officer

Commissioner of Patents and Trademarks